(12) United States Patent
Asanghanwa

(10) Patent No.: US 9,652,431 B2
(45) Date of Patent: May 16, 2017

(54) SINGLE WIRE COMMUNICATIONS USING PREDICTIVE HOST SAMPLING WINDOW

(71) Applicant: Atmel Corporation, San Jose, CA (US)

(72) Inventor: Eustace Ngwa Asanghanwa, Colorado Springs, CO (US)

(73) Assignee: Atmel Corporation, San Jose, CA (US)

( * ) Notice: Subject to any disclaimer, the term of this patent is extended or adjusted under 35 U.S.C. 154(b) by 293 days.

(21) Appl. No.: 14/605,135

(22) Filed: Jan. 26, 2015

(65) Prior Publication Data

US 2016/0217100 A1 Jul. 28, 2016

(51) Int. Cl.
G06F 13/42 (2006.01)
G06F 1/26 (2006.01)
G06F 13/40 (2006.01)

(52) U.S. Cl.
CPC .......... *G06F 13/4265* (2013.01); *G06F 1/266* (2013.01); *G06F 13/40* (2013.01)

(58) Field of Classification Search
CPC ............................. G06F 13/40; G06F 13/4295
See application file for complete search history.

(56) References Cited

U.S. PATENT DOCUMENTS

| | | |
|---|---|---|
| 5,210,846 A | 5/1993 | Lee |
| 5,483,176 A | 1/1996 | Rodriguez et al. |
| 5,978,927 A | 11/1999 | Curry et al. |
| 5,994,770 A | 11/1999 | Harrington et al. |
| 6,239,732 B1 | 5/2001 | Cusey |
| 6,532,506 B1* | 3/2003 | Dunstan .............. G06F 13/4295 326/86 |
| 7,006,949 B2* | 2/2006 | Moore .................... G06F 1/206 374/132 |
| 7,111,097 B2 | 9/2006 | Lin |
| 7,127,538 B1 | 10/2006 | Nekl |
| 7,406,100 B2 | 7/2008 | Rocas et al. |
| 7,519,005 B2 | 4/2009 | Hejdeman et al. |
| 7,577,756 B2 | 8/2009 | Teowee et al. |
| 7,667,534 B2 | 2/2010 | Klein |
| 7,782,240 B2 | 8/2010 | Ng et al. |
| 7,881,415 B2 | 2/2011 | Ng |
| 8,509,318 B2 | 8/2013 | Tailliet |
| 8,683,101 B2 | 3/2014 | Ingels |
| 8,698,358 B1 | 4/2014 | Peak et al. |
| 8,719,613 B2 | 5/2014 | Neben |
| 8,750,324 B2 | 6/2014 | Hansquine et al. |

(Continued)

*Primary Examiner* — Brian Misiura
(74) *Attorney, Agent, or Firm* — Fish & Richardson P.C.

(57) ABSTRACT

Systems and techniques for single-wire communications are described. A described system includes a host device, and a slave device coupled with the host device via a single-wire bus. The host device can be configured to transmit synchronization information based on transitions over the single-wire bus. The slave device can be configured to detect the transitions on the single-wire bus, determine timing information of the host device based on a first transition of the transitions and a second transition of the transitions, determine a predicted start time of a host sampling window based on the timing information, and determine, based on a predicted charging duration, whether to perform a charge operation before the predicted start time or after a predicted end time of the host sampling window. The charge operation can include drawing power from the single-wire bus to charge the device.

20 Claims, 9 Drawing Sheets

(56) References Cited

U.S. PATENT DOCUMENTS

| | | |
|---|---|---|
| 8,775,707 B2 | 7/2014 | Poulsen |
| 9,397,492 B2 * | 7/2016 | Voelger .................. H02H 3/20 |
| 9,490,999 B2 | 11/2016 | Manea et al. |
| 2012/0027104 A1 | 2/2012 | Bas et al. |
| 2012/0144078 A1 | 6/2012 | Poulsen |

* cited by examiner

SINGLE WIRE COMMUNICATIONS USING PREDICTIVE HOST SAMPLING WINDOW

TECHNICAL FIELD

This patent document relates generally to single-wire bus devices and systems.

BACKGROUND

Devices can use a single-wire bus for bidirectional communications. A host device can be connected with a slave device via a single-wire bus. Both the host device and the slave device can be connected to ground to complete the circuit. In some instances, a slave device can be implemented as an integrated circuit that is packaged in a housing that contains two pins: one for the single-wire bus and one for ground. The slave device can be parasitically powered from the single-wire bus. A single-wire bus can interconnect two or more devices.

SUMMARY

This document describes, among other things, technologies relating to single-wire communications. In one aspect, a described device can include a detector configured to detect transitions on a single-wire bus that are produced by a host; circuitry configured to determine timing information of the host based on a first transition of the transitions and a second transition of the transitions, and determine a predicted start time of a host sampling window based on the timing information; and a controller configured to determine, based on a predicted charging duration, whether to perform a charge operation before the predicted start time or after a predicted end time of the host sampling window, the charge operation including drawing power from the single-wire bus to charge the device.

This and other implementations can include one or more of the following features. The first transition and the second transition can provide synchronization information. In some implementations, the controller is configured to perform the charge operation before the predicted start time of the host sampling window based on the predicted charging duration reflecting that the charging operation is to complete before the predicted start time of the host sampling window. In some implementations, the controller is configured to perform the charge operation after the predicted end time of the host sampling window based on the predicted charging duration reflecting that the charging operation is not to complete before the predicted start time of the host sampling window. The charge operation can include maintaining the single-wire bus at a high state. In some implementations, the circuitry is configured to determine the timing information of the host based, at least in part, on a timing measurement from a first falling edge of the transitions to a second falling edge of the transitions. Implementations can include a transmitter configured to transmit a bit of information requested by the host over the single-wire bus for at least a duration that spans the host sampling window. The transmitter can be configured to pull the single-wire bus to a first voltage level if the bit of information represents a first bit state. The transmitter can be configured to maintain the single-wire bus at a second voltage level if the bit of information represents a second bit state, where the second voltage level is higher than the first voltage level. Implementations can include a non-volatile memory structure; and a processor configured to perform an operation responsive to a command received over the single-wire bus, where the bit of information is retrieved from the non-volatile memory structure in response to the command.

In another aspect, a method can include detecting, at a slave device, a first transition on a single-wire bus that is produced by a host device; detecting a second transition on the single-wire bus that is produced by the host device; determining timing information of the host device based on the first transition and the second transition; determining, based on the timing information, a predicted start time of a host sampling window; and determining, based on a predicted charging duration, whether to perform a charge operation before the predicted start time or after a predicted end time of the host sampling window, the charge operation including drawing power from the single-wire bus to charge the slave device.

This and other implementations can include one or more of the following features. The first transition and the second transition can provide synchronization information. Implementations can include performing the charge operation before the predicted start time of the host sampling window based on the predicted charging duration reflecting that the charging operation is to complete before the predicted start time of the host sampling window. Implementations can include performing the charge operation after the predicted end time of the host sampling window based on the predicted charging duration reflecting that the charging operation is not to complete before the predicted start time of the host sampling window. The charge operation can include maintaining the bus at a high state. In some implementations, the timing information of the host is determined based, at least in part, on a timing measurement from a falling edge of the first transition to a falling edge of the second transition. Implementations can include transmitting a bit of information requested by the host device over the single-wire bus for at least a duration that spans the host sampling window. Transmitting the bit of information can include pulling the single-wire bus to a first voltage level if the bit of information represents a first bit state; and maintaining the single-wire bus at a second voltage level if the bit of information represents a second bit state, where the second voltage level is higher than the first voltage level. Implementations can include performing an operation responsive to a command received over the single-wire bus, where the bit of information is retrieved from a non-volatile memory structure of the slave device in response to the command.

In another aspect, a system can include a host device; and a slave device coupled with the host device via a single-wire bus. The host device can be configured to transmit synchronization information based on transitions over the single-wire bus. The slave device can be configured to detect the transitions on the single-wire bus, determine timing information of the host device based on a first transition of the transitions and a second transition of the transitions, determine a predicted start time of a host sampling window based on the timing information, and determine, based on a predicted charging duration, whether to perform a charge operation before the predicted start time or after a predicted end time of the host sampling window, the charge operation including drawing power from the single-wire bus to charge the device.

This and other implementations can include one or more of the following features. In some implementations, the slave device is configured to perform the charge operation before the predicted start time of the host sampling window based on the predicted charging duration reflecting that the charging operation is to complete before the predicted start time of the host sampling window. In some implementations, the slave device is configured to perform the charge operation after the predicted end time of the host sampling window based on the predicted charging duration reflecting that the charging operation is not to complete before the predicted start time of the host sampling window. In some implementations, the charge operation can include maintaining the single-wire bus at a high state. In some implementations, the slave device is configured to determine the timing information of the host device based, at least in part, on a timing measurement from a first falling edge of the transitions to a second falling edge of the transitions. In some implementations, the slave device is configured to transmit a bit of information requested by the host device over the single-wire bus for at least a duration that spans the host sampling window. In some implementations, the slave device is configured to pull the single-wire bus to a first voltage level if the bit of information represents a first bit state, and wherein the slave device is configured to maintain the single-wire bus at a second voltage level if the bit of information represents a second bit state, where the second voltage level is higher than the first voltage level. The slave device can include a non-volatile memory structure; and a processor configured to perform an operation responsive to a command received over the single-wire bus, where the bit of information is retrieved from the non-volatile memory structure in response to the command. The host device can include a dynamic clock generator, and a processor that is responsive to an output of the dynamic clock generator, where a timing of the transitions are responsive to the output of the dynamic clock generator.

The details of one or more embodiments of the subject matter described in this document are set forth in the accompanying drawings and the description below. Other features, aspects, and advantages of the subject matter will become apparent from the description, the drawings, and the claims.

DETAILED DESCRIPTION

Figure 1:
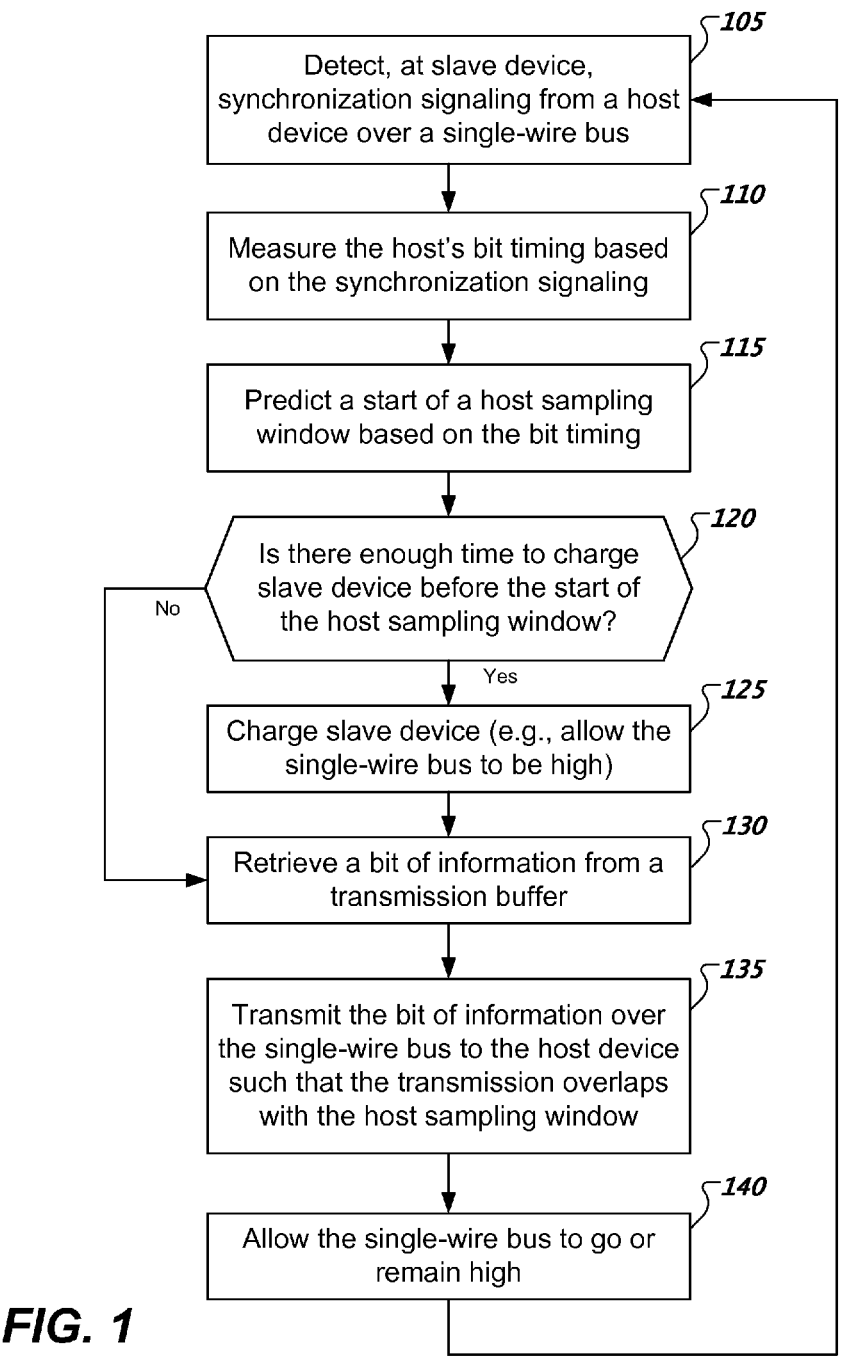
FIG. 1 shows a flowchart of an example of a process performed by a slave device that is in communication with a host device via a single-wire bus.

A system can include a host device communicatively coupled with a slave device over a single-wire bus. The devices can exchange data over the single-wire bus, for example, by causing voltage transitions. The timing of the single-wire bus can be set by the host device and can change over the course of operation. For example, the host device can switch between high and low performance modes that are associated with high and low clock frequencies. The host may transmit faster on the bus during the high clock frequency and transmit more slowly on the bus during the low clock frequency. The slave device can determine the host device's timing information, such as the clock frequency, an inter-transition delay or both, and use the information for one or more transmissions to the host device.

The slave device can be powered parasitically by the single-wire bus. For example, when the single-wire bus is in a high state, the slave device can be charged by the bus. The slave device, in some implementations, transmits a 1-bit by allowing the single-wire bus to remain in a high state, and transmits a 0-bit by pulling the single-wire bus into a low state. Pulling the bus low can quickly drain the charge of the slave device and prevents the device from being charged by the bus. Thus, the slave device can risk running out of charge while it pulls the bus low. The slave device can adjust the timing of when it has to pull the bus low such that it has sufficient charge to complete a bit transmission. The adjustment of the timing of the bus pull down event can be based on the host timing to ensure reliable communications between the host and slave devices.

After the host device requests data from the slave device, the slave device can use the host timing to predict when the host device will sample the single-wire bus to obtain data from the slave device. The slave device can determine whether to perform a charge operation based on the predicted host sampling window. In some implementations, the slave device can defer the charge operation until after the host sampling window if the charge operation would overlap with the host sampling window, which may cause interference. In some implementations, when the slave device is required to transmit a 0-bit by pulling the bus into a low state and there is sufficient time before the start of the host sampling window, the slave device can perform a charge operation by deferring the bus pull down event such that the slave device can be charged by the bus.

In some implementations, the host device can write data bit-by-bit to the slave device, and can read data bit-by-bit from the slave device over the single-wire bus. For example, the host device can request an N-bit value from the slave device by transmitting a data request command to the slave device. For each bit of the N-bit value, the host can transmit synchronization signaling and, in response, can receive a respective bit of the N-bit value. In some implementations, the slave device includes a co-processor such as a cryptographic processor. In some implementations, the slave device includes a sensor controller. In some implementations, the slave device includes a non-volatile memory and provides a random access interface to the host device for accessing data stored in the non-volatile memory. Other types of slave devices are possible.

FIG. 1 shows a flowchart illustrating an example of a process performed by a slave device that is in communication with a host device via a single-wire bus. At 105, the process detects synchronization signaling from a host device over a single-wire bus. Synchronization signaling can include, for example, two or more pairs of high-low transitions. The transitions can include, for example, a sync transition and a bit request transition. At 110, the process measures the host's bit timing ($T_{host}$) based on the synchronization signaling. Measuring the host's bit timing can include measuring the time between two high-low transitions. In some implementations, measuring the time can include using a timing mechanism such as a timer to measure time from a falling edge of the signaling to the next falling edge. In some implementations, measuring the time can include using a timing mechanism to measure time from a rising edge of the signaling to the next rising edge. In some implementations, measuring the time can include using a timing mechanism to measure time between adjacent edges, e.g., a falling edge to a raising edge or a raising edge to a falling edge.

At 115, the process predicts a start ($T_{sample-start}$) of a host sampling window based on the bit timing. Predicting the start of the host sampling window can include, for example, determining the earliest time that the host device will sample the single-wire bus. In some implementations, predicting the start of the host sampling window can include determining a sampling midpoint ($T_{sample-mid}$) based on the host bit timing ($T_{host}$) and applying a predetermined sampling margin of error around the determined midpoint ($T_{sample-mid}$) to compute the predictive start ($T_{sample-start}$) of the host sampling window and the predictive end ($T_{sample-end}$) of the host sampling window. In some implementations, the start ($T_{sample-start}$) of a host sampling window is measured from the last transition of the synchronization signaling.

At 120, the process determines whether there is enough time to charge the slave device before the start of the host sampling window. Determining whether there is enough time can include, for example, comparing a (i) predicted charging duration ($T_{charge}$) to charge the slave device to a sufficient charge level and (ii) the predictive start ($T_{sample-start}$) of the host sampling window. If there is not enough time (e.g., $T_{charge} \geq T_{sample-start}$), the process continues at 130. If there is enough time (e.g., $T_{charge} < T_{sample-start}$), the process at 125, charges the slave device. In some implementations, charging the slave device can include allowing the single-wire bus to remain in a high state by not pulling down the single-wire bus such that a capacitor of the slave device can be charged from the single-wire bus. In some implementations, a sufficient charge level is based on an amount of charge required of the capacitor by the slave device to sustain power to the slave device until the next charge. In some implementations, if the slave device projects that it has enough power to last through a bit transmission given the predictive start time ($T_{sample-start}$), then the slave device may defer charging until after the end of the host sampling window.

At 130, the process retrieves a bit of information from a transmission buffer. At 135, the process transmits the bit of information over the single-wire bus to the host device such that the transmission overlaps with the host sampling window. In some implementations, a duration of the transmission can be based on the predictive start ($T_{sample-start}$) of the host sampling window and the predictive end ($T_{sample-end}$) of the host sampling window. At 140, the process allows the single-wire bus to go or remain high.

Figure 2A:
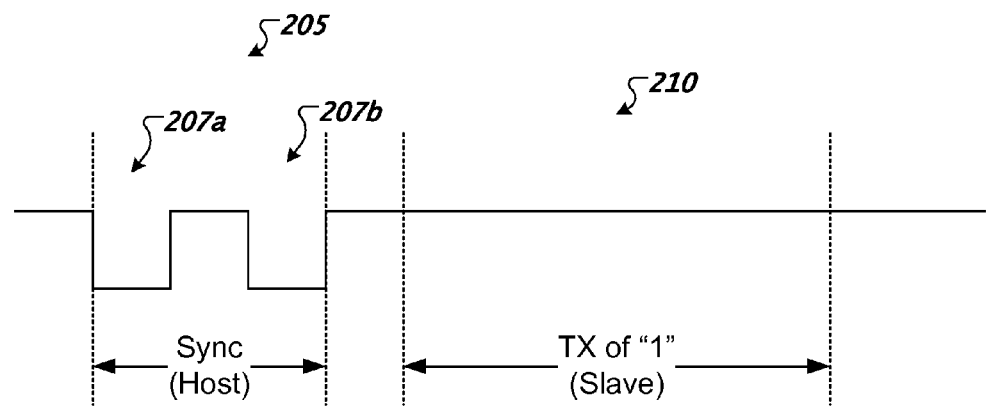
FIGS. 2A and 2B show timing diagrams of examples of single-wire bus communications.
Figure 2B:
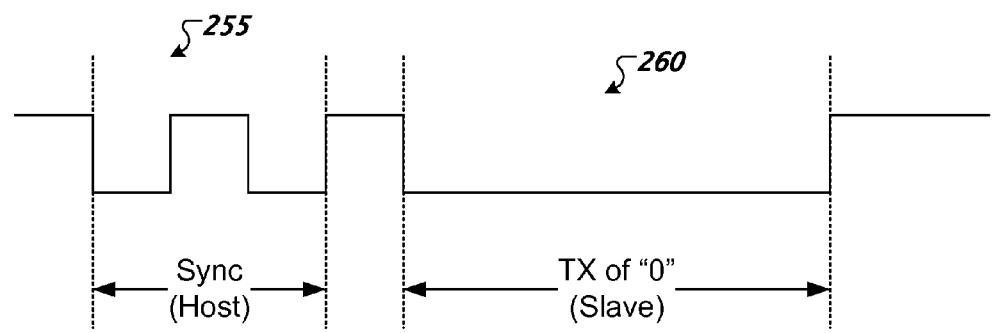

FIGS. 2A and 2B show timing diagrams illustrating examples of single-wire bus communications. In FIG. 2A, a host device transmits synchronization signaling 205. The synchronization signaling 205 can include two or more voltage transitions. In response, the slave device transmits a bit 210. In this example, the bit 210 is a logical one. The slave device transmits the bit 210 by allowing the single-wire bus to remain high. In some implementations, the synchronization signaling 205 is divided into a synchronization portion 207a and a data request portion 207b. In FIG. 2B, a host device transmits synchronization signaling 255.

The synchronization signaling 255 can include two or more voltage transitions. In response, the slave device transmits a bit 260. In this example, the bit 260 is a logical zero. The slave device transmits the bit 260 by pulling low the single-wire bus.

Figure 3:
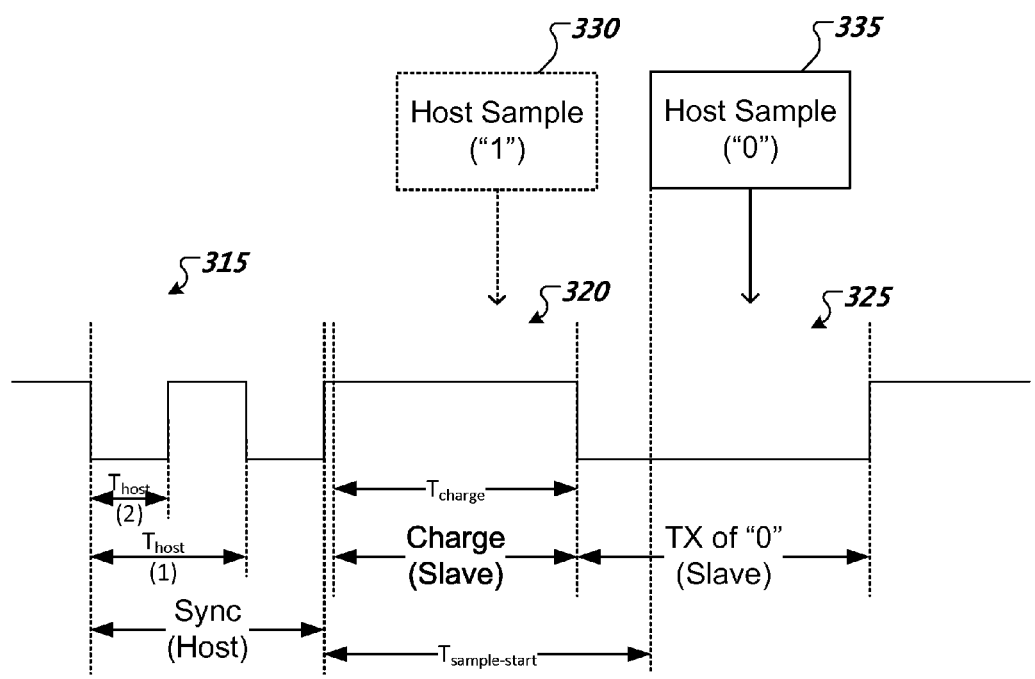
FIG. 3 shows a timing diagram illustrating an example of a timing relationship among a charge operation at a slave device, transmission operation at the slave device, and sampling operation at a host device.

FIG. 3 shows a timing diagram illustrating an example of a timing relationship among a charge operation at a slave device, transmission operation at the slave device, and sampling operation at a host device. The host device transmits synchronization signaling 315 over a single-wire bus. A slave device can measure a host bit timing ($T_{host}$) based on at least part of the synchronization signaling 315. In some implementations, the slave device can measure a full cycle host bit timing ($T_{host}(1)$) from falling edge to falling edge. In some implementations, the slave device can measure a half cycle host bit timing ($T_{host}(2)$) from falling edge to rising edge. Based on the host bit timing ($T_{host}$) derived from the synchronization signaling 315, the slave device can predict a start ($T_{sample-start}$) time of a host sampling window. In some implementations, the start of the window is measured from an end of the synchronization signaling 315. If a slave device determines that there is enough time to charge before the host samples the single-wire bus (e.g., $T_{charge} < T_{sample-start}$), the slave device will charge itself by allowing the single-wire bus to remain high during a charge phase 320. In this example, the slave device is transmitting a logical zero, which corresponds to a low voltage level signal. After the charge phase 320, the slave device pulls down the single-wire bus to transmit a logical zero during a transmission phase 325. The host samples the bus during the transmission phase 325, which results in a correct host sample 335 (e.g., a logical zero "0" in this case). If the host were to sample the bus during the charge phase 320, an incorrect host sample 330 would result (e.g., a logical one "1" in this case). The slave device can defer the charge phase 320 if a charge operation is expected to interfere with the host sample 335.

Figure 4A:
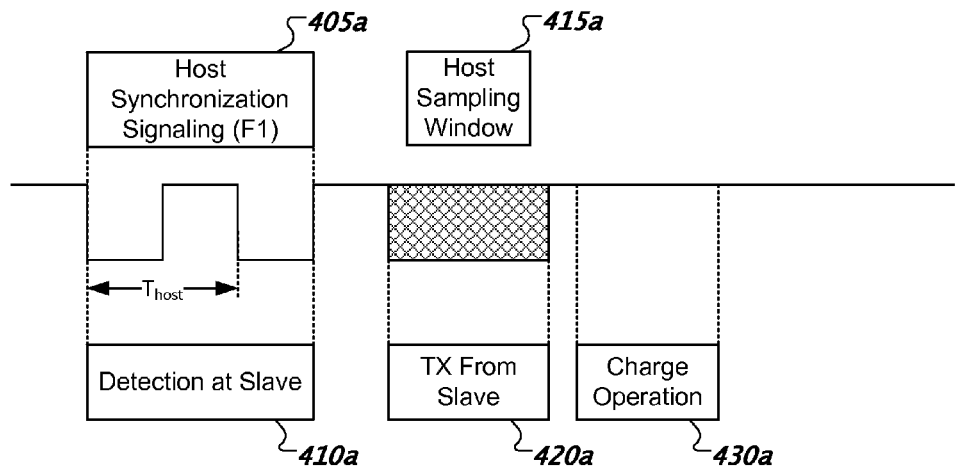
FIGS. 4A and 4B show timing diagrams illustrating examples of single-wire bus communications and associated activities for different host clock frequencies.
Figure 4B:
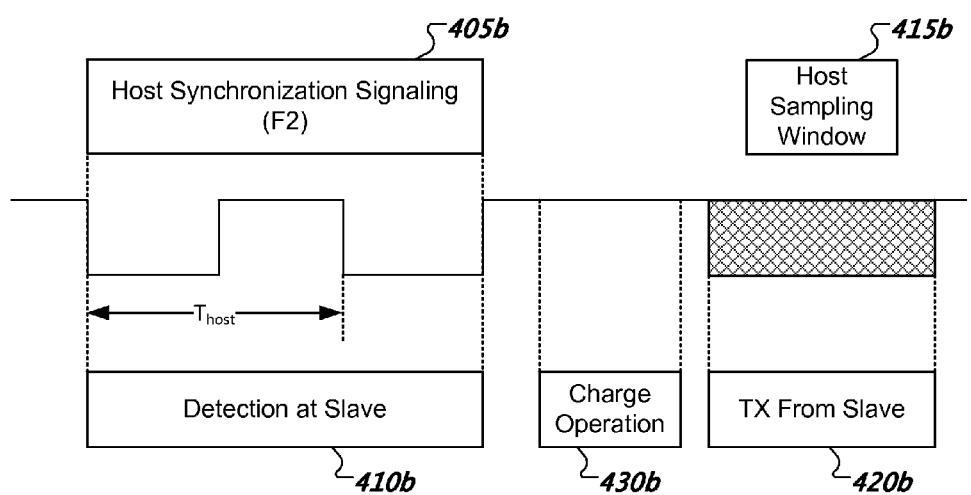

FIGS. 4A and 4B show timing diagrams illustrating examples of single-wire bus communications and associated activities for different host clock frequencies. A host device can have a variable frequency processor that is configured, for example, to operate at different frequencies and can dynamically change frequencies to meet different operating requirements (e.g., high-performance mode, idle mode, or sleep mode). In some implementations, the host frequency can increase in response to demands placed on the processor. For example, rendering a video may require a higher clock frequency than viewing a still image. A slave device can determine the host's frequency for proper communications with the host device. The host device can transmit synchronization signaling 405a-b over a single-wire bus in order for the slave device to determine the host's frequency among other things. A slave device can detect 410a-b the synchronization signaling 405a-b. Based on the synchronization signaling 405a-b, the slave device can transmit a bit of data 420a-b to the host device. Further, the slave device can use the synchronization signaling 405a-b to predict a host sampling window 415a-b during which the host device is predicted to sample the single-wire bus to ascertain a bit state of the transmitted bit of data 420a-b.

In FIG. 4A, the host device is transmitting the synchronization signaling 405a at a high frequency (F1). The slave device can measure a timing difference ($T_{host}$) from a falling edge of a first transition to a falling edge of a second transition of the synchronization signaling 405a. In FIG. 4B, the host device is transmitting the synchronization signaling 405b at a low frequency (F2). Here too, the slave device can measure a timing difference ($T_{host}$) from a falling edge of a first transition to a falling edge of a second transition of the synchronization signaling 405b.

The host's frequency, the start of the host sampling window 415a-b, and the start of the charge operation 430a-b can be determined based on the timing difference. In FIG. 4A, the slave device determines that the charge operation 430a will occur after its transmission 420a because there is insufficient time before the host sampling window 415a to complete the charge operation 430a. In FIG. 4B, the slave device determines that the charge operation 430b will occur before its transmission 420b because there is sufficient time before the host sampling window 415b to complete the charge operation 430b.

Figure 5:
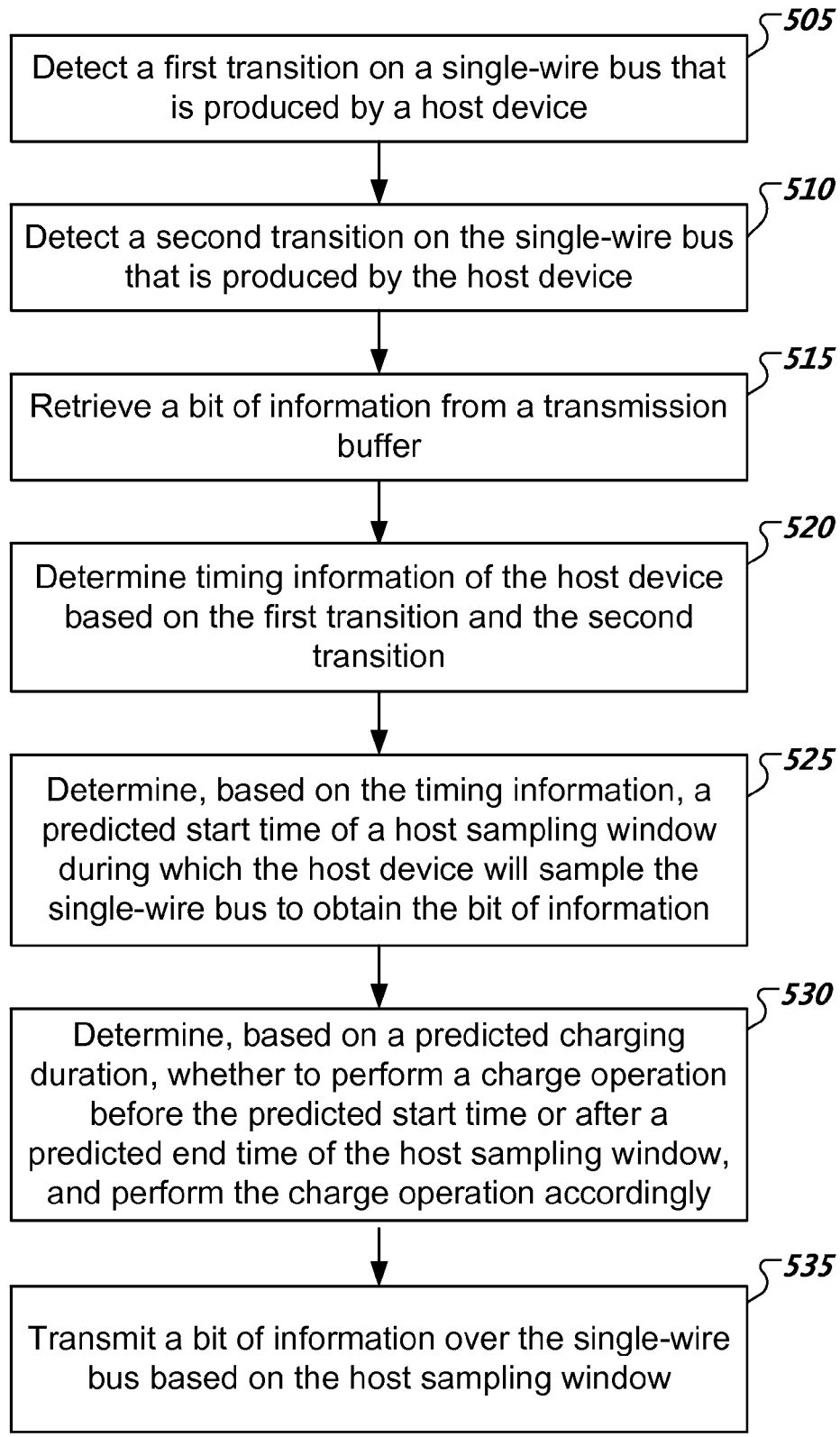
FIG. 5 shows a flowchart illustrating another example of a process performed by a slave device that is in communication with a host device via a single-wire bus.

FIG. 5 shows a flowchart illustrating another example of a process performed by a slave device that is in communication with a host device via a single-wire bus. At 505, the process detects a first transition on a single-wire bus that is produced by a host device. In some implementations, detecting a transition can include using edge-detection logic circuitry that triggers on a falling edge of an input waveform, a rising edge of the input waveform, or both. At 510, the process detects a second transition on the single-wire bus that is produced by the host device. In some implementations, the first transition and the second transition are respectively a first falling edge and a second falling edge. In some implementations, the first transition and the second transition are respectively a falling edge and an adjacent rising edge. In this example, the first transition and the second transition are used by the host device to synchronize and request a bit of information from the slave device.

At 515, the process retrieves a bit of information from a transmission buffer. At 520, the process determines timing information of the host device based on the first transition and the second transition. Determining the timing information of the host device can include measuring a timing difference from a falling edge of the first transition to a falling edge of the second transition. The frequency of the host device can be determined based on the timing difference.

At 525, the process determines, based on the timing, a predicted start time of a host sampling window during which the host device will sample the single-wire bus to obtain the bit of information. At 530, the process determines, based on a predicted charging duration, whether to perform a charge operation before the predicted start time or after a predicted end time of the host sampling window. The process performs the charge operation in accordance with the determination. In some implementations, a predicted charging duration can be based on a predetermined parameter derived based on a charging rate and a required charge amount. The charge operation can include drawing power from the single-wire bus to charge the slave device. In some implementations, the charge operation can include maintaining the single-wire bus at a high state by not pulling down the bus. In some implementations, a time difference ($T_{diff}$) between the first detected transition at 505 and the second detected transition at 510 (e.g., time of rising edge minus time of the initial falling edge) is compared to a $T_{SLAVE\_LOW\_MAX}$ parameter that specifies the maximum time that the slave device can pull and keep the bus in a low state without risking running out of charge. In some implementations, if $T_{diff} \ll T_{SLAVE\_LOW\_MAX}$ and a 0-bit is to be transmitted, then the slave device can immediately pull the bus into a low state to transmit the 0-bit. In some implementations, if $T_{diff} > T_{SLAVE\_LOW\_MAX}$ and a 0-bit is to be transmitted, then the slave device can defer transmission of the 0-bit to a time in the future based on either $T_{diff}$ for $T_{sample-start}$ sampling or $T_{diff} - T_{SLAVE\_LOW\_MAX}/2$ for $T_{sample-mid}$ sampling. In some implementations, the comparison can add a margin to account for race conditions between bit transmission and sampling event.

At 535, the process transmits the bit of information over the single-wire bus based on the host sampling window. In some implementations, the process transmits the bit of information over the single-wire bus for at least a duration that spans the host sampling window. In some implementations, the process transmits the bit of information over the single-wire bus for at least a duration that spans a portion of the host sampling window. Transmitting the bit of information can include pulling the single-wire bus to a low voltage level $V_L$ if the bit of information represents a bit state of logical zero. Transmitting the bit of information can include maintaining the single-wire bus at a high voltage level $V_H$ if the bit of information represents a bit state of logical one.

Performing a charge operation based on the determination of 530, can include performing the charge operation before the predicted start time of the host sampling window based on the predicted charging duration reflecting that the charging operation is to complete before the predicted start time of the host sampling window. Performing a charge operation based on the determination of 530, can include performing the charge operation after the predicted end time of the host sampling window based on the predicted charging duration reflecting that the charging operation is not to complete before the predicted start time of the host sampling window. In some implementations, the act of transmitting a logical one (e.g., by not pulling down the single-wire bus) can be used to charge the slave device.

Figure 6:
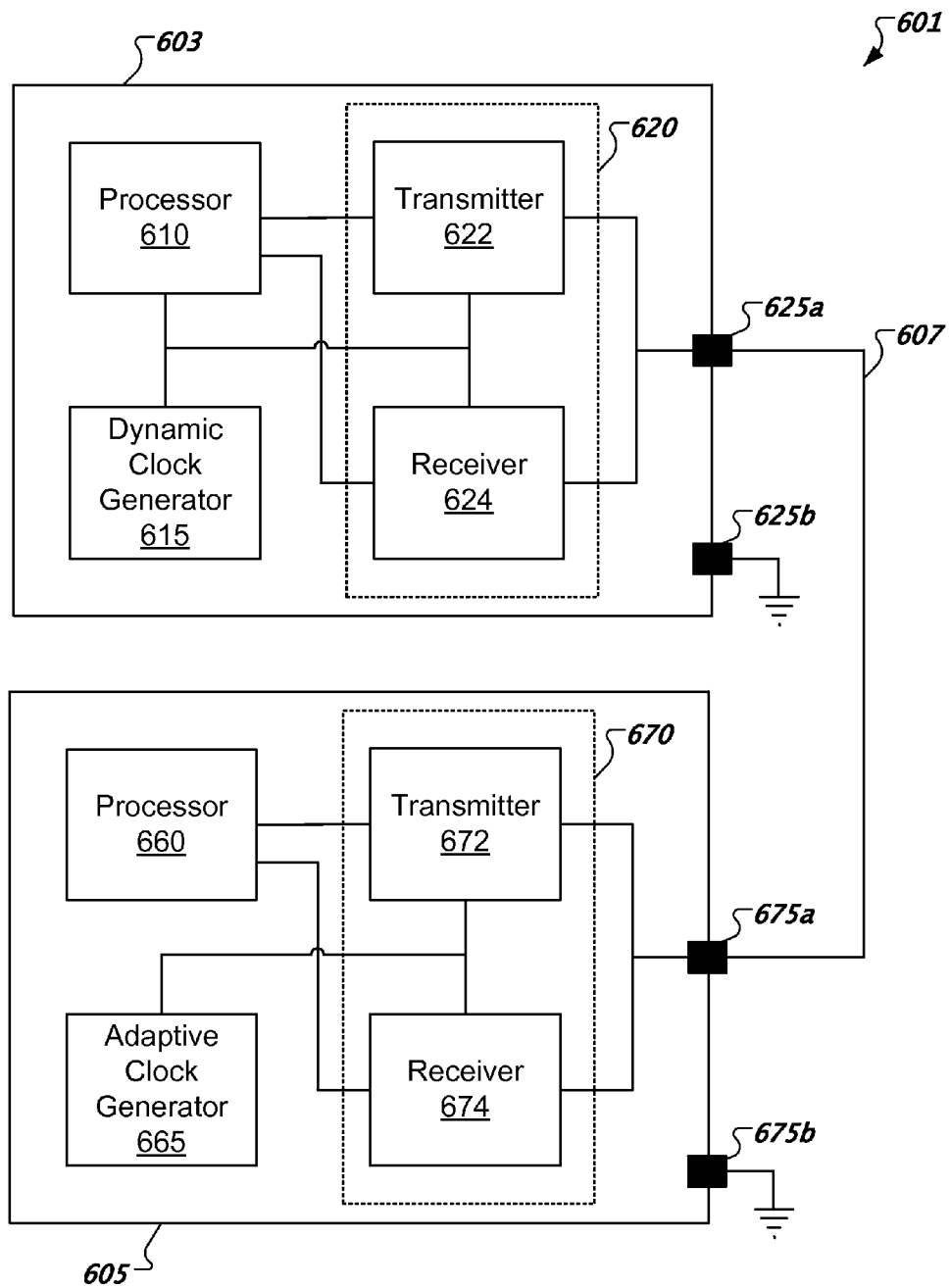
FIG. 6 shows a diagram illustrating an example of a single-wire bus based system.

FIG. 6 shows a diagram illustrating an example of a single-wire bus based system 601. The system 601 can include a host device 603 and a slave device 605. The host device 603 and the slave device 605 can be connected to each other electrically via a single-wire bus 607. In some implementations, the single-wire bus 607 includes an electrical conduit formed on a printed circuit board or through a wire. In some implementations, the single-wire bus 607 interconnects two devices. In some implementations, the single-wire bus 607 interconnects three or more devices.

The host device 603 can include, for example, a processor 610, dynamic clock generator 615, and a host single-wire bus interface 620. The host single-wire bus interface 620 can include a transmitter 622 and a receiver 624. The transmitter 622 and the receiver 624 can be coupled electrically with a pin 625a of the host device 603 that is intended for coupling with the single-wire bus 607. Another pin 625b of the host device 603 can provide a connection to ground. In some implementations, the pins 625a-b are pins of an integrated circuit package that forms the host device 603. The dynamic clock generator 615 can include a variable clock frequency generator that is configured to produce one or more different clock frequencies for the processor 610 and the host single-wire bus interface 620. In some implementations, the processor 610 can adjust the dynamic clock generator 615 to increase a host clock frequency or decrease the host clock frequency based on a current or predicted processing load of the processor 610. Based on a receive command from the processor 610 and a clock frequency of the dynamic clock generator 615, the transmitter 622 can generate and transmit synchronization signaling. The timing of transitions within the synchronization signaling can be based on the host clock frequency.

The slave device 605 includes, for example, a processor 660, adaptive clock generator 665, and a slave single-wire bus interface 670. The slave single-wire bus interface 670 can include a transmitter 672 and a receiver 674. In some implementations, the adaptive clock generator 665 can use synchronization signaling received over the slave single-wire bus interface 670 via the receiver 674 to determine the host clock frequency of the host device 603. The adaptive clock generator 665 can provide the determined host clock frequency to the transmitter 672 and the receiver 674. The transmitter 672 and the receiver 674 can be coupled electrically with a pin 675a of the slave device 605 that is intended to couple with the single-wire bus 607. Another pin 675b of the slave device 605 can provide a connection to ground. In some implementations, the pins 675a-b are pins of an integrated circuit package that forms the slave device 605.

In some implementations, the processors 610, 660 include one or more general purpose processors, a field programmable gate array (FPGA), an application specific integrated circuit (ASIC), digital signal processor (DSP), or a combination thereof. The devices 603, 605 can include one or more memory structures. In some implementations, the slave device 605 includes a non-volatile memory structure. The processor 660 of the slave device 605 can be configured to perform an operation responsive to a command received over the single-wire bus from the host device 603. A command such as a read command can cause the slave device 605 to retrieve an N-bit value from the non-volatile memory structure and prepare the retrieved value for transmission to the host device 603.

Figure 7:
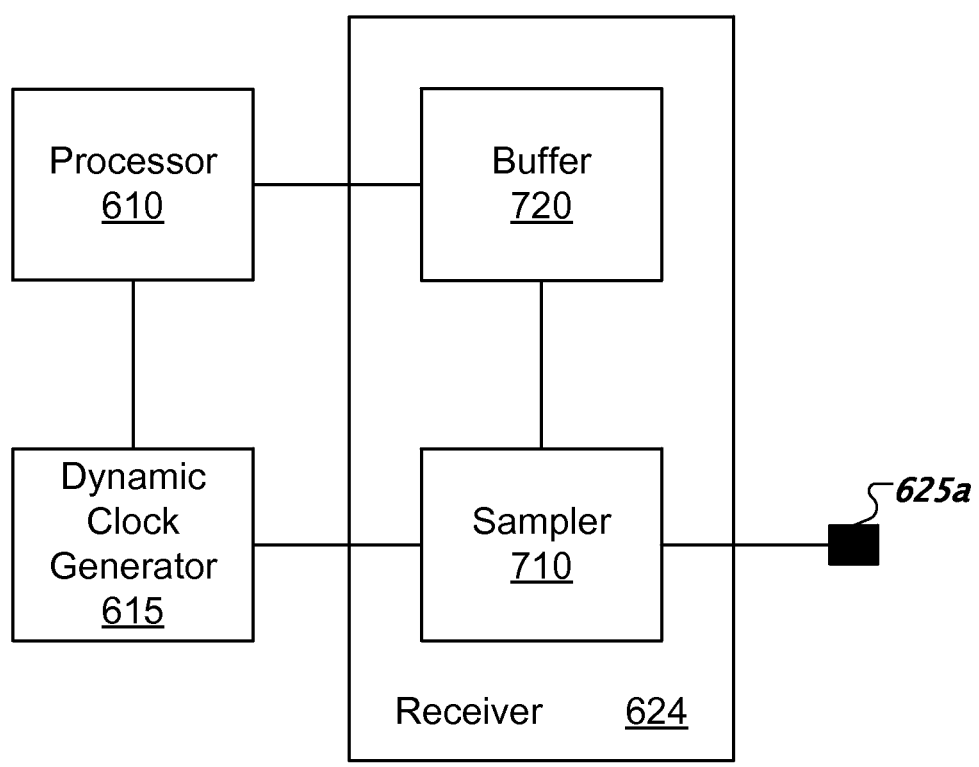
FIG. 7 shows a diagram illustrating an example of the receiver of the host single-wire bus interface of FIG. 6.

FIG. 7 shows a diagram illustrating an example of the receiver 624 of the host single-wire bus interface 620 of FIG. 6. The receiver 624 can include a sampler 710 and a buffer 720. Based on a host clock frequency produced by the dynamic clock generator 615, the sampler 710 takes a sample of the single-wire bus 607 that is coupled with pin 625a. For example, based on a falling edge of a clock waveform from dynamic clock generator 615, the sampler 710 determines whether the single-wire bus 607 is in a high state or a low state. In some implementations, if the single-wire bus 607 is in the high state, the sampler 710 can output a logical one to the buffer 720; likewise, if the single-wire bus 607 is in the low state, the sampler 710 can output a logical zero to the buffer 720. The buffer 720 can provide one or more buffered bits to the processor 610. In some implementations, the sampler 710 includes circuitry such as a comparator that compares an input voltage from pin 625a to a reference voltage that corresponds to the high state.

Figure 8:
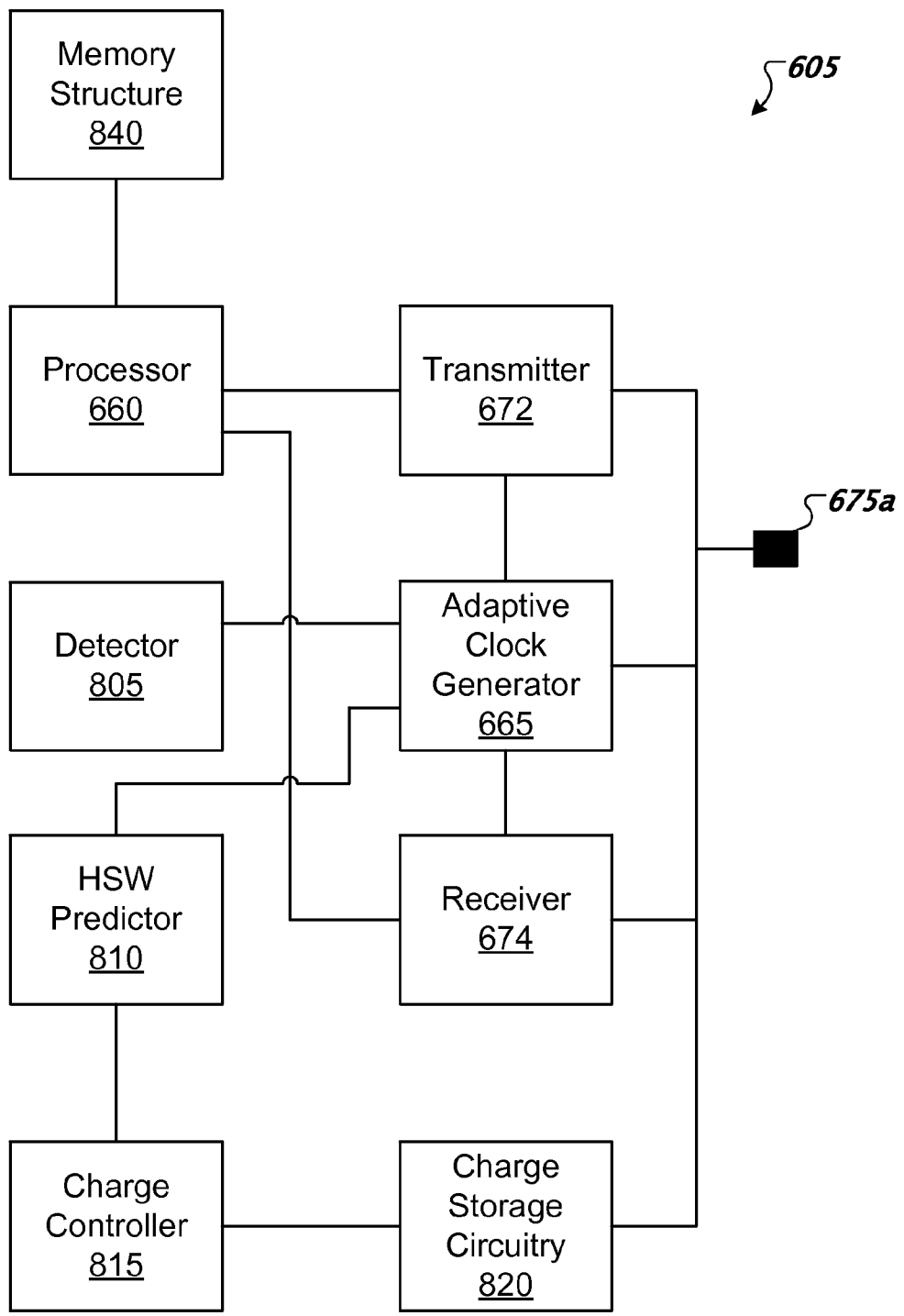
FIG. 8 shows a diagram illustrating an example of a slave device of the system of FIG. 6.

FIG. 8 shows a diagram illustrating an example of a slave device 605 of the system 601 of FIG. 6. The slave device 605 includes a processor 660, adaptive clock generator 665, transmitter 672, receiver 674, host sampling window predictor 810, charge controller 815, and charge storage circuitry 820. The adaptive clock generator 665 can use synchronization signaling received over pin 675a from the single-wire bus 607 to determine timing information such as the host clock frequency of the host device 603 or a timing difference between falling edges in synchronization signaling. In some implementations, the adaptive clock generator 665 can include a detector 805 configured to detect transitions on the single-wire bus 607 that are produced by the host device 603. The detector 805 can include edge-detection logic circuitry. The transitions can synchronize the slave device 605 and request a bit of information from the slave device 605.

The adaptive clock generator 665 can provide the timing information to the transmitter 672, the receiver 674, and the host sampling window predictor 810. The charge controller 815 can compare a predicted charging duration $T_{charge}$ with an output (e.g., a predicted start time) from the host sampling window predictor 810. If it is determined that there is sufficient time for complete or at least partial charging, the charge controller 815 can cause the charge storage circuitry 820 to draw energy from the single-wire bus 607 via pin 675a. In some implementations, the charge controller 815 is coupled with the transmitter 672. In some implementations, the charge controller 815 can send an override signal to the transmitter 672 such that the transmitter 672 can keep the single-wire bus 607 in a high state for a duration of $T_{charge}$ in order for the charge storage circuitry 820 to charge by drawing from pin 675a. After $T_{charge}$, the transmitter 672 can keep the single-wire bus 607 in a high state to transmit a logical one or the transmitter 672 can pull the single-wire bus 607 to a low state to transmit a logical zero. In some implementations, after $T_{charge}$, the transmitter 672 can keep the single-wire bus 607 in a high state to transmit a logical zero or the transmitter 672 can pull the single-wire bus 607 to a low state to transmit a logical one. In some implementations, the charge storage circuitry 820 can include circuitry such as a capacitor which can be used to storage a charge.

The slave device 605 can include a memory structure 840. In some implementations, the processor 660 can be configured to perform an operation responsive to a command received over the single-wire bus 607. For example, one or more bits can be retrieved from the memory structure 840 in response to a read command. In some implementations, the transmitter 672 can include a transmission buffer. In some implementations, the receiver 674 can include a reception buffer.

In some implementations, a slave can measure the host's clock frequency to anticipate the next host sampling event. In some instances, preceding every sampling action by the host in a transaction is a host start action that includes two events: rapid back-to-back bus low and high transitions. The slave can records these events as two edge transitions from which it can determine an inter-transition delay or an inter-edge delay. Using this determined delay, the slave can predict the earliest time the host is able to manifest the sample action. If the inter-transition delay is small enough to fall within the client's maximum low transition for the logical zero signaling, the slave pulls the single-wire bus down to communicate the logical zero for the host to sample. If the inter-transition delay is long, e.g., beyond the limits the slave can hold the line low, instead of pulling the line low after detecting the second edge as a nominal slave would do, the slave device can delay the pull down event (for transmitting a logical zero) until the time when it is guaranteed to capture the host's sampling event. This delay in pulling down the bus can be used to charge the slave device.

Figure 9:
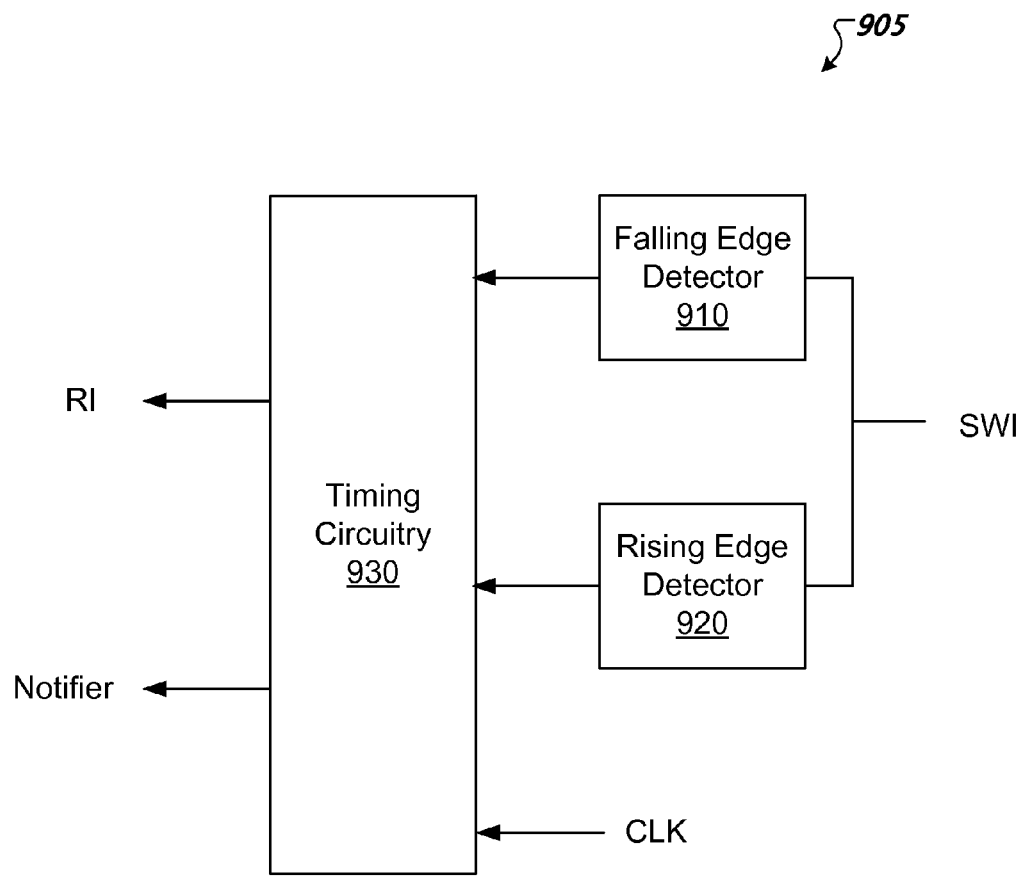
FIG. 9 shows a diagram illustrating an example of a host frequency estimator 905.

FIG. 9 shows a diagram illustrating an example of a host frequency estimator 905. The host frequency estimator 905 can include a falling edge detector 910, a rising edge detector 920, and timing circuitry 930. The falling edge detector 910 and the rising edge detector 920 are coupled to a single wire bus interface (SWI) and provide output signals to timing circuitry 930. The falling edge detector 910 provides a signal based on detection of a falling edge. The rising edge detector 920 provides a signal based on detection of a rising edge. In some implementations, the timing circuitry 930 includes a timer. In some implementations, the timing circuitry 930 includes a counter that counts pulses of a local clock (CLK) signal between a detection of a falling edge and a detection of a rising edge. The clock signal can be an order of magnitude higher than the highest frequency anticipated for the single-wire bus. The timing circuitry 930 can output a notifier signal that informs the rest of the device circuitry of a host sync event, completion of host frequency estimation, or both. The timing circuitry 930 can output a registered interval (RI) value. The RI value can be a binary representation of host frequency estimation available for use in predictive windowing estimation. In some implementations, the RI value is based on a counter value that reflects counted clock pulses between detected edges.

Particular embodiments of the technology described in this document can be implemented so as to realize one or more of the following advantages. One or more described technologies can minimize or eliminate host sampling errors due by scheduling charging operations at a slave device around the times the host device will sample the single-wire bus. One or more described technologies can reduce the cost of manufacturing a slave device, single-wire bus system, or both by allowing smaller capacitors to be used for parasitically powering the slave device. One or more described technologies can provide the ability to effectively communicate data asynchronously over a single-wire bus with a host device that has a varying clock frequency.

While this document contains many specific implementation details, these should not be construed as limitations on the scope of any inventions or of what may be claimed, but rather as descriptions of features specific to particular embodiments of particular inventions. Certain features that are described in this document in the context of separate embodiments also can be implemented in combination in a single embodiment. Conversely, various features that are described in the context of a single embodiment also can be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A device comprising:
    a detector configured to detect transitions on a single-wire bus that are produced by a host, wherein the transitions provide synchronization information;
    circuitry configured to (i) determine timing information of the host based on a first transition of the transitions and a second transition of the transitions, and (ii) determine a predicted start time of a host sampling window based on the timing information; and
    a controller configured to determine, based on a predicted charging duration, whether to perform a charge operation before the predicted start time or after a predicted end time of the host sampling window, wherein the charge operation comprises drawing power from the single-wire bus to charge the device.

2. The device of claim 1, wherein the controller is configured to perform the charge operation before the predicted start time of the host sampling window based on the predicted charging duration reflecting that the charging operation is to complete before the predicted start time of the host sampling window.

3. The device of claim 1, wherein the controller is configured to perform the charge operation after the predicted end time of the host sampling window based on the predicted charging duration reflecting that the charging operation is not to complete before the predicted start time of the host sampling window.

4. The device of claim 1, wherein the charge operation comprises maintaining the single-wire bus at a high state.

5. The device of claim 1, wherein the circuitry is configured to determine the timing information of the host based, at least in part, on a timing measurement from a first falling edge of the transitions to a second falling edge of the transitions.

6. The device of claim 1, comprising:
    a transmitter configured to transmit a bit of information requested by the host over the single-wire bus for at least a duration that spans the host sampling window, wherein the transmitter is configured to pull the single-wire bus to a first voltage level if the bit of information represents a first bit state, and wherein the transmitter is configured to maintain the single-wire bus at a second voltage level if the bit of information represents a second bit state, wherein the second voltage level is higher than the first voltage level.

7. The device of claim 1, comprising:
    a non-volatile memory structure; and
    a processor configured to perform an operation responsive to a command received over the single-wire bus, wherein the bit of information is retrieved from the non-volatile memory structure in response to the command.

8. A method comprising:
    detecting, at a slave device, a first transition on a single-wire bus that is produced by a host device;
    detecting a second transition on the single-wire bus that is produced by the host device, wherein the first transition and the second transition provide synchronization information;
    determining timing information of the host device based on the first transition and the second transition;
    determining, based on the timing information, a predicted start time of a host sampling window; and
    determining, based on a predicted charging duration, whether to perform a charge operation before the predicted start time or after a predicted end time of the host sampling window, wherein the charge operation comprises drawing power from the single-wire bus to charge the slave device.

9. The method of claim 8, comprising:
    performing the charge operation before the predicted start time of the host sampling window based on the predicted charging duration reflecting that the charging operation is to complete before the predicted start time of the host sampling window.

10. The method of claim 8, comprising:
    performing the charge operation after the predicted end time of the host sampling window based on the predicted charging duration reflecting that the charging operation is not to complete before the predicted start time of the host sampling window.

11. The method of claim 8, transmitting a bit of information requested by the host device over the single-wire bus for at least a duration that spans the host sampling window, wherein transmitting the bit of information comprises:
    pulling the single-wire bus to a first voltage level if the bit of information represents a first bit state; and
    maintaining the single-wire bus at a second voltage level if the bit of information represents a second bit state, wherein the second voltage level is higher than the first voltage level.

12. A system comprising:
    a host device; and
    a slave device coupled with the host device via a single-wire bus, wherein the host device is configured to transmit synchronization information based on transitions over the single-wire bus, wherein the slave device is configured to (i) detect the transitions on the single-wire bus, (ii) determine timing information of the host device based on a first transition of the transitions and a second transition of the transitions, (iii) determine a predicted start time of a host sampling window based on the timing information, and (iv) determine, based on a predicted charging duration, whether to perform a charge operation before the predicted start time or after a predicted end time of the host sampling window, wherein the charge operation comprises drawing power from the single-wire bus to charge the device.

13. The system of claim 12, wherein the slave device is configured to perform the charge operation before the predicted start time of the host sampling window based on the predicted charging duration reflecting that the charging operation is to complete before the predicted start time of the host sampling window.

14. The system of claim 12, wherein the slave device is configured to perform the charge operation after the predicted end time of the host sampling window based on the predicted charging duration reflecting that the charging operation is not to complete before the predicted start time of the host sampling window.

15. The system of claim 12, wherein the charge operation comprises maintaining the single-wire bus at a high state.

16. The system of claim 12, wherein the slave device is configured to determine the timing information of the host device based, at least in part, on a timing measurement from a first falling edge of the transitions to a second falling edge of the transitions.

17. The system of claim 12, wherein the slave device is configured to transmit a bit of information requested by the host device over the single-wire bus for at least a duration that spans the host sampling window.

18. The system of claim 17, wherein the slave device is configured to pull the single-wire bus to a first voltage level if the bit of information represents a first bit state, and wherein the slave device is configured to maintain the single-wire bus at a second voltage level if the bit of information represents a second bit state, wherein the second voltage level is higher than the first voltage level.

19. The system of claim 12, wherein the slave device comprises:
 a non-volatile memory structure; and
 a processor configured to perform an operation responsive to a command received over the single-wire bus, wherein the bit of information is retrieved from the non-volatile memory structure in response to the command.

20. The system of claim 12, wherein the host device comprises a dynamic clock generator, and a processor that is responsive to an output of the dynamic clock generator, wherein a timing of the transitions are responsive to the output of the dynamic clock generator.

* * * * *